United States Patent [19]
Payne et al.

[11] 3,987,987
[45] Oct. 26, 1976

[54] SELF-ERECTING WINDMILL

[76] Inventors: Peter R. Payne, Rte. 5 Box 282, Annapolis, Md. 21401; Charles McCutchen, 5213 Acacia Ave., Bethesda, Md. 20014

[22] Filed: Jan. 28, 1975

[21] Appl. No.: 544,617

[52] U.S. Cl. .............................. 244/153 R; 290/44; 290/55
[51] Int. Cl.² ...................... B64C 31/06; F03D 5/00
[58] Field of Search............ 244/33, 8, 58, 153–155; 290/53–55, 42, 44, 43, 52

[56] References Cited
UNITED STATES PATENTS

| | | | |
|---|---|---|---|
| 2,368,630 | 2/1945 | Bizjak | 244/58 |
| 2,433,344 | 12/1947 | Crosby | 244/33 |
| 2,784,556 | 3/1957 | Perdue | 290/55 |
| 3,730,643 | 5/1973 | Davison | 290/55 |
| 3,794,273 | 2/1974 | Girard | 244/8 |

FOREIGN PATENTS OR APPLICATIONS

| | | | |
|---|---|---|---|
| 110,315 | 4/1940 | Australia | 244/33 |
| 466,172 | 10/1951 | Italy | 244/33 |
| 489,139 | 7/1938 | United Kingdom | 244/155 R |

*Primary Examiner*—Trygve M. Blix
*Assistant Examiner*—Galen L. Barefoot
*Attorney, Agent, or Firm*—Sughrue, Rothwell, Mion, Zinn and Macpeak

[57] ABSTRACT

A device which lifts itself into the air and either itself carries a windmill for the extractions of power from the wind, or traverses a oscillatory path back and forth across the wind such that the action of the tethering lines for the device can be used to generate useful power (such as electricity) is disclosed. A series of airborne structures, an autogyro-helicopter, the paramill, and a sail plane are all disclosed as the self-erecting structures. Power is extracted either within the airborne structure, preferably by electric generators, or from the tethering lines through the use of centrifugal or other pumps, or electric generators. Stability and control of the self-erecting structure is accomplished via the use of servomotors or control lines directed from the energy extracting site through the tether to the erectable member.

3 Claims, 10 Drawing Figures

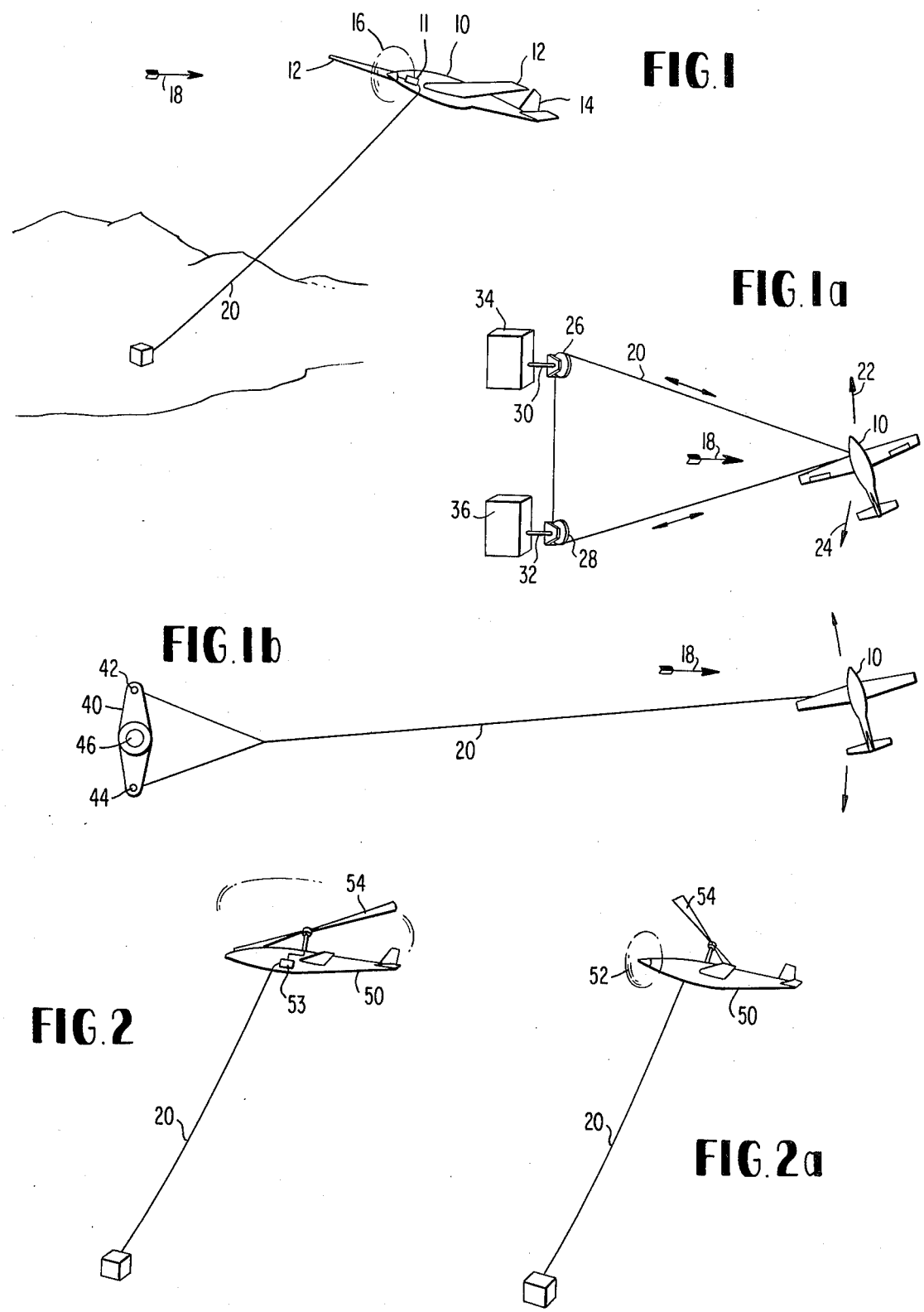

SELF-ERECTING WINDMILL

BACKGROUND OF THE INVENTION

1. Field of the Invention

This invention relates to the field of self-erecting windmills used to extract the power from the wind.

2. Prior Art

Windmills are the most commonly known devices to utilize the motion of air to effectuate a rotary motion in the production of useful energy. In the prior art, it is well known that the use of fixed site, horizontal or vertically in placed windmills have received the most consideration. These devices, as typified by the Hallady-Perry windmill design of the 1920's and 1930's, have been used conventionally either to drive pumps for the extraction of water from subsurface locations or, for the generation of electricity. The refinement of such devices today as a result of current societal demands to find alternative techniques for the generation of energy has become an object of technological research and inquiry. The prior art is replete with attempts to improve the efficiency of various windmill components, such as blades, bearings and reduction gears to reduce the cost of such windmill designs while effectuating a modest increase in output. Current attempts at optimizing windmill design center around vast size increases with the use of current technology to minimize moments of inertia and frictional forces existing in such large systems. One reason for the dramatic increase in research, vis-a-vis orders of magnitude larger windmill devices is the known gradient of windspeed as a function of height above the surface. It is well established that the speed of the wind increases substantially at heights approximately 50 to 75 feet above ground level due to factors of ground turbulance, wind sheer and the existence of steady state conditions above localized obstructions which allow continuous motion of the air thereby permitting steady state wind conditions at speeds much higher than ground conditions. In a very crude sense, this can be noticed in the performance of sailboats, wherein on very calm periods those craft with very tall masts are able to move through the action of wind approximately 50 feet above sea level while smaller craft with smaller masts are unable to generate any motion as a result of the lack of wind closer to the water's surface. Accordingly, it becomes an important consideration in the effective utilization of any windmill system that it be located at a sufficient height above the ground so as to receive a stronger and steadier flow of air.

Were it possible to build a tower 1,000 feet or more high another advantage would accrue. At these heights the nighttime drop in wind speed is far less than near the surface, and the windmill would become a steadier and more reliable source of power.

The prior art attempted to achieve this condition by the use of large towers upon which the windmills were placed. Even today, with contemporary research, the use of large towers supporting large blades appears to be one viable alternative to the problem of locating the windmill above ground level.

SUMMARY OF THE INVENTION

This invention relates to a class of windmills which are not solidly erected on fixed structures, but rather are self-erecting in the sense that they remain tethered to the ground and depend on aerodynamic forces to remain aloft. The use of a self-erecting type of windmill eliminates one of the principle shortcomings of the prior art, the problem of locating the windmill at a maximum economically feasible height above the ground. A variety of structures are known which will follow prescribed paths, tacking across the wind such that the motion of the structure itself generates forces on the tethering cable to facilitate the generation of useful energy. Alternatively, the use of propellers on board the self-erecting structure with the tether serving as an electrical connection from an on board generator can be used. By the use of known control techniques, the self-erecting member can be kept in a prolonged flight status. Also, the efficient transfer of energy from the tether to electromechanical devices can be used to effectuate the generation of energy. Accordingly, it is an object of this invention to provide for a class of self-erecting windmills. It is another object of this invention to provide for a class of windmills having greater efficiency per unit size and weight than conventional fixed site rotary windmills; it is a further object of this invention to provide for a class of self-erecting windmills that utilize the motion of the erecting member on a tether to generate useful energy.

Other objects and features of the invention will become apparent from a study of the following detailed description of several embodiments.

BRIEF DESCRIPTION OF THE DRAWINGS

FIG. 1 is a perspective view of a first embodiment of this invention;

FIG. 1a is a top view of a first alternative embodiment of a tethering mechanism for the FIG. 1 self-erecting structure;

FIG. 1b is a top view of a second alternative tethering system for the self-erecting structure of FIG. 1;

FIG. 2 is a perspective view of a second embodiment of this invention utilizing a helicopter as a self-erecting structure;

FIG. 2a is a perspective of a modification of the helicopter of FIG. 2 showing conversion as an autogyro helicopter;

DETAILED DESCRIPTION OF THE PREFERRED EMBODIMENT

Figure 2B:
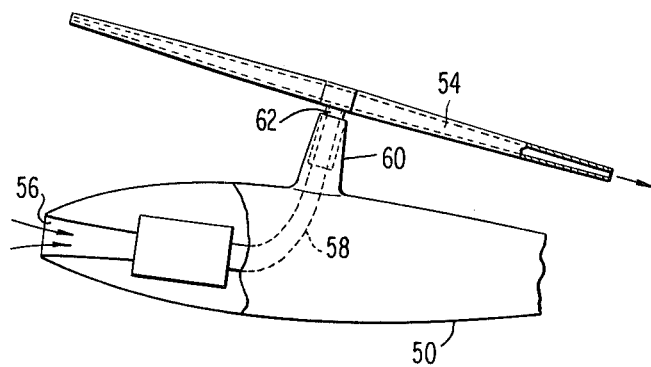
FIG. 2b is a perspective side view of FIG. 2 showing the introduction of air into the self-erecting structure for extracting power from the rotor by the Andreau "depression" system.

The single biggest obstacle to the energy conversion of wind on an economical scale is the great size of the plant needed per unit of power generated. Conventionally, to be economically and technologically feasible, installations have been expensive to construct and maintain, and large single units have been fragile and generally unreliable. A self-erecting windmill as shown in the preferred embodiment is a combination of a kite and a windmill that lifts itself into the air and once airborne extracts power from the wind to generate electricity or perform some other useful task. The use of self-erecting windmills have at least three distinct advantages over the conventional fixed site windmill. First, it uses one or more supporting cables instead of a massive and expensive tower; secondly, it is disposed for operation at a greater distance above the ground that a conventional windmill and, accordingly, receives a stronger, steadier wind; and thirdly, it can interact with more air than a tower supported windmill of the same blade area. Balanced against these advantages are the waste of energy in maintaining the self-erecting windmill in the air, and additionally the necessity of control gear to guide its flight, including landing, whenever the wind speed falls too low for successful operation, and the subsequent take-off when the wind again rises. Referring now to FIG. 1, a first embodiment of a self-erecting windmill is shown. The windmill 10 may look very much like a conventional airplane, having wings 12 and a tail assembly 14. A propeller 16 located in the nose of the windmill would be used in connection with an electrical generator to supply electricity. Alternatively, not shown, the propeller could be located in the tail section of the windmill to clear the tether. The windmill is flown as a kite and the propeller is utilized to generate power. It is possible to completely have the power generating equipment located on board the kite and the location there presents several advantages. Electrical machinery is far lighter than it was a few years ago, so much lighter that a man carrying, battery powered aircraft has recently been flown in Germany. At altidudes of flight, cooling air is readily available, enhancing operation. The generator should preferably operate at high voltages so as to reduce the weight of the power cables leading to the ground. Except for the spinning of the propeller, the windmill could hang motionless in the sky. The propeller 16 interacts with a cylinder of air that passes through it. However, by making the kite tack rapidly from side-to-side across the wind, shown by the direction of the arrow 18, both the amount and the relative velocity of the air that flows through the propeller disc can be dramatically increased. If, for example, the speed of the kite through the air is increased by a factor (F), the power it can produce increases by a factor of $(F)^3$.

Accordingly, it becomes desirable to have the self-erecting windmill tack or otherwise move cross-wise to the wind. Once this is accomplished, airborne generation may be dispensed with and the power can effectively be extracted from the motion of the tethering cable shown as 20 in FIG. 1. The kite can then be made lighter, so it can fly and generate power in lighter winds. The steerage of kites powered by the wind has been known for many hundreds of years.

FIG. 1a shows a typical tethering system wherein the power generated by the self-erecting windmill is extracted from the system by the tethering action. As shown, the windmill structure 10 is used to tack across the direction of the wind 18 and is coupled to the ground by a tethering cable 20. As the aircraft moves in the direction shown by arrow 22, the tethering cable tends to move in a counterclockwise direction until a prescribed limit of travel is reached. At that point, the aircraft is tacked to fly in a direction 24 wherein the cable moves in the opposite direction. By the use of suitable pulleys 26, 28, having output shafts 30, 32, the effective generation of electricity is possible by the coupling of shafts 30, 32, to generators, pumps or other power converters 34, 36, in a conventional manner.

The rope and pulley technology is well known, and was developed to a high level of efficiency and reliability in factories in the era before electricity displaced mechanical power distributing systems. A variety of methods now exist for producing constant frequency, constant voltage a.c. from a variable speed, variable torque mechanical motion, one example being a d.c. generator followed by an inverter. When the wind strength rises to the point that strength limits of the aircraft and cables are approached, the air speed of the kite can be controlled by flying in a direction more directly into the wind. This mode of operation tends to hold the power output approximately constant. Additionally, the kite may tack in a wind having a speed slower than the stalling regime for the kite much like a sailplane tacking back and forth in front of a ridge. In this situation, the kite will land with a non-zero ground speed, and if unpowered will be unable to again take off. However, well-known techniques for launching kites can be employed once the wind increases. FIG. 1b shows a first alternative preferred embodiment of the tethering structure shown in FIG. 1a. In this embodiment, the kite 10 is again tethered on cable 20 such that it tacks back and forth across the wind shown by arrow 18. However, rather than employing a succession of pulleys, the single tethering line is coupled to ends of a link member 40 at points 42 and 44. The link member 40 is pivoted about pin 46 such that it tends to oscillate back and forth in a motion directly corresponding to that of the kite. By the use of well-known transfer mechanisms the oscillatory motion of link 40 about pin 46 can be converted into electrical energy or dedicated to other purposes.

Referring now to FIG. 2, a second preferred self-erecting windmill structure is shown. This embodiment is generally a helicopter-autogyro arrangement. As shown in FIG. 2a, if the kite is utilized as an autogyro 50, a generator can be driven either by a front facing propeller 52 or by the main rotor 54. The device is tethered by line 20 to a fixed location on the ground. As shown in FIG. 2b, the kite 50 may have a (preferably forward) opening 56 for the introduction of air. By conventional ducting 58 through rotor support 60 air may be sucked through a hollow opening in blade 54 to exit through a hollow opening in the tip of the blade facing in the aft direction. The helicopter rotor then acts as a centrifugal pump drawing air through an air turbine 62 and expelling it through the rotor tips and with a generator connected to the turbine 62, as in the Andreau "depression" system, driven at a convenient speed for the generation of electrical power, the kite acts as an efficient self-erecting windmill. Running the generator as a motor and the machine as an axial flow compressor allows the kite to take off as a tip-driven helicopter. Alternatively, the generator can be connected to the rotor 54. There is then a torque resulting from the rotor which must be balanced by the tether cables, a tail rotor or by using a counterrotating arrangement of main rotors. However, the balancing of dynamic forces such as generated herein is well-known in the helicopter art and need not be discussed. For maximum power output, the autogyro shown in FIG. 2a, should be tacked through the wind in a manner similar to that shown in FIG. 1. As in the case of FIG. 1a, the generation of electrical power need not be effectuated from the use of a generator on board the kite, but rather if the autogyro 50 is flown in a tethered mode, power may be extracted from the motion of the tethers. The autogyro may then be conventionally constructed in a very light manner such that the landing speed will be very slow as will the rate of descent. Accordingly, the autogyro and helicopter can simply be wound down to the ground.

Figure 3:
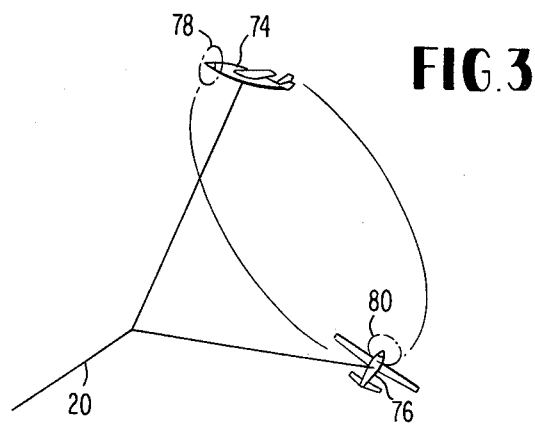
FIG. 3 is a schematic showing a second alternative self-erecting structure comprising two tethered kites rotating about each other.

A variation on the autogyro-helicopter scheme is a system utilizing two kites, shown in FIG. 3. In this embodiment, kites 74 and 76 rotate around each other at opposite ends of a cable or tether 20. A propeller 78, 80 located in the nose of each kite is utilized to drive a dynamo and thereby generate power. Operation of this device requires that upon landing the aircraft are wound down while rotating under power in the horizontal plane. During the final stages of the winding-in, the span of distance between the aircraft can be reduced such that diameter of the required circulator landing field is similarly reduced.

Figure 4:
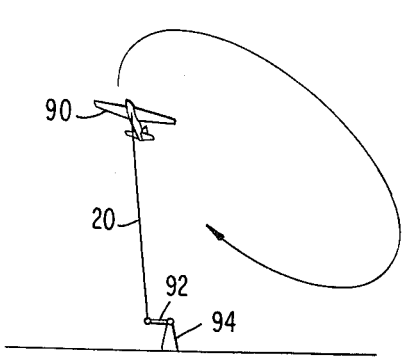
FIG. 4 shows still another alternative embodiment with the self-erecting structure flying a circular pattern.

Another preferred embodiment for utilizing the motion of a kite that more than supplies its own losses is shown in FIG. 4. The operation of the kite 90 is generally described in American Aircraft Modeller, September, 1972, pages 20 and 21, whereby a motorless control line model is flown in the wind by making the device 90 sweep out a tipped orbit with the high side of the kite upward as for an autogyro rotor. In this mode of flight, power could be collected from a propeller and dynamo in a manner shown in FIG. 1 or, by attaching the tether cable 20 to a large crank 92 pivoted about fixture 94 on the ground. In either case, the forces delivered to the ground could be reduced by having two aircraft 180° apart as shown in FIG. 3, circling around and ensuring that the phase relationship between attached tethers is maintained by having opposite ends coupled to a long double-ended hub (not shown). In this mode of operation and the scheme shown in FIG. 3 the aircraft in essence tacks in a circle as shown in FIG. 4.

Figure 5:
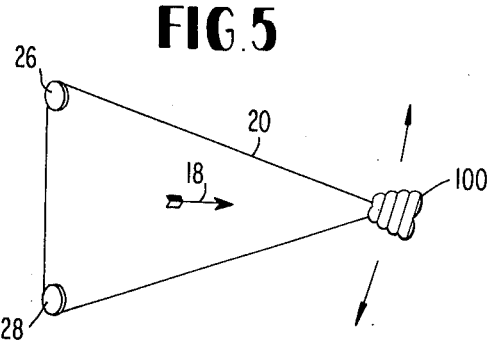
FIG. 5 shows another embodiment using a paraglider structure as the self-erecting member.
Figure 5A:
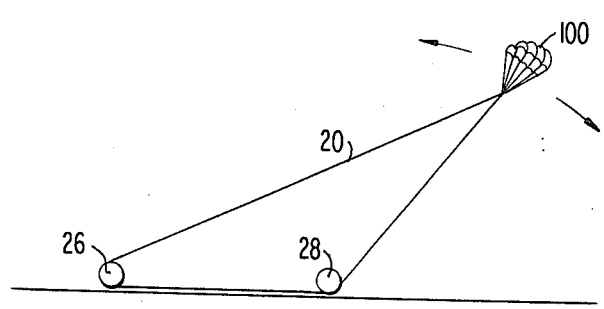
FIG. 5a is an elevation view of the structure of FIG. 5.

The systems described thus far interact with the necessarily large amount of air by the use of rapid rotation. These systems contain a large amount of kinetic energy which is not desirable should a failure occur in the system, and additionally, high speeds cause aerodynamic noise. An alternative is to make the kite light, large and relatively slow by making it in the form of a paraglider. Such a device, shown schematically in FIG. 5 and FIG. 5a, is built of cloth on parachute principles. It has been shown that lift to drag ratios of devices of this type is in the order of 6, (see "Steerable Parachutes". Development Center, Marine Corp. Development and Education Command, Quantico, Virginia; Project No. 20-60-LO, (January, 1973)). These devices would allow the paraglider to be tacked quite rapidly across the wind and power would be extracted from the motion of the tethers as the device is tacked. As shown in FIG. 5, a paraglider 100 is coupled by tether 20 and in the direction of the wind 18, the device tacks laterally when the wind is in a direction across the line between two delaying points. Should the wind shift through 90° the device can tack vertically as shown in FIG. 5a because of the light-weight of the kite. Additionally, this lightness reduces the landing speed and reduces the kinetic energy in the system. Power may be extracted in a manner similar to that shown in FIG. 1a where generators are coupled to the axles of each tether roller, or alternatively, by the crank mechanism of FIG. 1b.

One of the significant aspects of this invention is the mode by which power is extracted from the tethers. To the extent that any analysis can ignore the attraction of gravity on the kite, all forces will scale as the wind velocity squared if the kite performs the same zig-zag motion relative to the wind velocity. Because aerodynamic lift forces are present, the attraction of gravity is minimized so long as sufficient lift is generated to keep the kite airborne. To absorb the power generated efficiently, the mechanism on the ground must offer a resistance that is proportional to the speed$^2$. This matching can be done electromechanically with sophisticated control gear. However, any device that accelerates material against only the inertial reaction of the material itself, for example, a centrifugal or piston pump exhausting into zero pressure, could be matched to the kite at all speeds. The pump would offer a resistance proportional to the square of the input velocity, whether it be a shaft rpm or piston speed, and also proportional to the square of the velocity of the outflowing fluid. A liquid jet of this type can be used to drive an impulse turbine. If the turbine blades are long and the nozzle is spring-mounted, the liquid can be made to meet the blades at a radius proportional to the jet velocity, and thereby yield its energy efficiently to a constant speed turbine.

Additionally, the glider, autogyro and parachute kites involve no control problems whose solutions are not simple, well-known and frequently applied. Control can be applied by servomotors aboard the aircraft or in a marionette fashion via lines from the ground. A tethered one-bladed helicopter has already been controlled with no difficulty [see:"Aeromodeller", April, 1958, pg. 191] as has the motorless control line model as demonstrated in the reference cited herein. A mutually orbiting pair of aircraft has similarly been demonstrated to be stable in free flight. However, no trials have been made with such a system in a tethered mode. But, the individual aircraft are controllable with elevators and appear, should respond to the cyclic application of the elevators in a manner analogous to the helicopter rotor. As interest in self-erecting structures increases, it can be expected that control logic and even mechanisms will become cheaper, more efficient and of lighter weight.

It is to be understood that the above-identified and described embodiments are merely illustrative of numerous and varied other arrangements which may form applications of the principles of this invention. Other embodiments may readily be devised by those skilled in the art without departing from the spirit and scope of the invention.

What is claimed is:

1. A wind driven apparatus for the production of energy comprising:
    means responsive to the motion of air for maintaining a stable airborne orientation, said orientation comprising periodic oscillations through the air and said airborne orientation maintained as a result of aerodynamic lift;
    coupling means for linking said means responsive to the motion of air to a ground location, said coupling means movable in response to the oscillations of said means responsive to the motion of air; and
    means disposed at said ground location for converting the movements of said coupling means into usable energy.

2. Apparatus for the production of energy comprising:

means responsive to the motion of air for maintaining a stable oscillating airborne orientation, said means comprising a kite that tacks back and forth across the wind;
coupling means for linking said means responsive to the motion of air to a ground location, said coupling means comprising a cable oscillating in response to the movement of said kite; and
means disposed at said ground location for converting the movement of said coupling means into usable energy.

3. Apparatus for the production of energy comprising:
means responsive to the motion of air for maintaining a stable oscillating airborne orientation, said means comprising a paraglider tacking across the wind;
coupling means for linking said means responsive to the motion of air to a ground station, said coupling means comprising a cable oscillating in response to the movement of said paraglider; and
means disposed at said ground location for converting the movement of said coupling means into usable energy.

* * * * *